US008539877B2

(12) United States Patent
Levy et al.

(10) Patent No.: US 8,539,877 B2
(45) Date of Patent: Sep. 24, 2013

(54) COOKING DEVICE AND METHOD OF COOKING

(75) Inventors: Shuki Levy, Los Angeles, CA (US); Tori Avey, Los Angeles, CA (US)

(73) Assignee: TenderMoist, LLC, Los Angeles, CA (US)

( * ) Notice: Subject to any disclaimer, the term of this patent is extended or adjusted under 35 U.S.C. 154(b) by 0 days.

(21) Appl. No.: 13/422,426

(22) Filed: Mar. 16, 2012

(65) Prior Publication Data

US 2012/0282385 A1  Nov. 8, 2012

Related U.S. Application Data

(60) Provisional application No. 61/482,661, filed on May 5, 2011.

(51) Int. Cl.
*A47J 37/10* (2006.01)
*A23L 1/01* (2006.01)

(52) U.S. Cl.
USPC ................ 99/347; 99/421 V; 99/426; 99/345; 99/419; 426/510; 426/523; 426/509

(58) Field of Classification Search
USPC ........ 99/347, 421 V, 426, 345, 419; 426/510, 426/523, 509
See application file for complete search history.

(56) References Cited

U.S. PATENT DOCUMENTS

| | | | | |
|---|---|---|---|---|
| 2,212,477 A | * | 8/1940 | Mayer | 99/532 |
| 2,602,391 A | * | 7/1952 | Pedranti et al. | 99/345 |
| 3,333,526 A | * | 8/1967 | Kirkpatrick | 99/347 |
| 3,511,164 A | * | 5/1970 | Peckenpaugh et al. | 99/532 |
| 3,713,378 A | * | 1/1973 | West et al. | 99/346 |
| 3,830,191 A | | 8/1974 | Burke | |
| 3,840,686 A | * | 10/1974 | Hurwitz | 426/231 |
| 4,000,396 A | * | 12/1976 | Abel, Jr. | 392/442 |
| 4,129,066 A | * | 12/1978 | Corley | 99/345 |
| 4,178,660 A | * | 12/1979 | Olney et al. | 99/494 |
| 4,607,569 A | * | 8/1986 | Murphy | 99/426 |
| 4,617,860 A | * | 10/1986 | Blaylock | 99/415 |
| 4,633,773 A | * | 1/1987 | Jay | 99/426 |
| 4,709,626 A | * | 12/1987 | Hamlyn | 99/426 |
| 4,847,099 A | * | 7/1989 | Elinsky | 426/233 |
| 5,301,602 A | * | 4/1994 | Ryczek | 99/345 |
| 5,507,221 A | * | 4/1996 | Lagares-Corominas | 99/532 |
| 5,787,873 A | * | 8/1998 | Whitehouse | 126/25 R |
| 5,893,320 A | | 4/1999 | Demaree | |
| 5,922,377 A | * | 7/1999 | Nordstrom | 426/132 |

(Continued)

OTHER PUBLICATIONS

International Search Report and Written Opinion for PCT Patent Application No. PCT/US2012/029408 dated Jun. 19, 2012.

*Primary Examiner* — Joseph M Pelham
*Assistant Examiner* — Jimmy Chou
(74) *Attorney, Agent, or Firm* — Schnader Harrison Segal & Lewis LLP

(57) ABSTRACT

A cooking device, for insertion into food, having a shell with a top portion and a bottom portion, securable together at a latitudinal cross section of the shell. The top portion has one or more steam holes to allow seasoning placed in the device to permeate the food during the cooking process. The cooking device can be stood on its base in an upright position for filling with seasoning, and can then be disposed substantially perpendicular to the upright position during the cooking process, without seasoning that is not in a gaseous phase running or spilling out of the steam holes.

21 Claims, 15 Drawing Sheets

(56) References Cited

U.S. PATENT DOCUMENTS

| | | | |
|---|---|---|---|
| 5,938,053 A | 8/1999 | Verbovszky et al. | |
| 6,026,734 A * | 2/2000 | Dadez | 99/345 |
| 6,062,131 A * | 5/2000 | Holland | 99/345 |
| 6,125,739 A * | 10/2000 | Jernigan | 99/345 |
| 6,192,792 B1 * | 2/2001 | Gremillion | 99/426 |
| 6,216,586 B1 | 4/2001 | Burgin | |
| 6,272,976 B1 * | 8/2001 | Berryman | 99/340 |
| 6,349,632 B1 * | 2/2002 | Beck, Jr. | 99/345 |
| 6,427,582 B1 * | 8/2002 | Measom | 99/342 |
| 6,439,112 B1 * | 8/2002 | Pope | 99/487 |
| 6,460,452 B1 * | 10/2002 | Hester | 99/347 |
| 6,487,964 B2 * | 12/2002 | Snoke et al. | 99/345 |
| 6,502,501 B1 * | 1/2003 | Simon | 99/345 |
| 6,557,460 B2 * | 5/2003 | Hester | 99/347 |
| 6,622,616 B1 * | 9/2003 | Measom | 99/345 |
| 6,644,176 B2 * | 11/2003 | Prip | 99/394 |
| 6,692,783 B2 * | 2/2004 | Hunter | 426/281 |
| 6,706,301 B2 * | 3/2004 | Vaughan | 426/466 |
| 6,779,438 B1 * | 8/2004 | Citrynell et al. | 99/347 |
| 7,007,592 B2 * | 3/2006 | Citrynell et al. | 99/347 |
| 7,024,987 B2 * | 4/2006 | Haber | 99/384 |
| 7,063,007 B2 * | 6/2006 | Citrynell et al. | 99/347 |
| 7,144,596 B2 * | 12/2006 | Snoke et al. | 426/644 |
| 7,320,275 B2 * | 1/2008 | Jenkins et al. | 99/345 |
| 7,739,948 B2 * | 6/2010 | Backus et al. | 99/340 |
| 7,879,381 B2 * | 2/2011 | Dow et al. | 426/523 |
| D639,601 S * | 6/2011 | Borovicka et al. | D7/354 |
| 2001/0039884 A1 * | 11/2001 | Backus et al. | 99/421 H |
| 2002/0018834 A1 * | 2/2002 | Vaughan | 426/523 |
| 2002/0178928 A1 * | 12/2002 | Hunter | 99/419 |
| 2004/0187699 A1 * | 9/2004 | Citrynell et al. | 99/345 |
| 2004/0200358 A1 * | 10/2004 | Citrynell et al. | 99/426 |
| 2005/0039609 A1 * | 2/2005 | Scharbo et al. | 99/419 |
| 2007/0181006 A1 * | 8/2007 | Measom | 99/345 |
| 2008/0092751 A1 * | 4/2008 | Backus et al. | 99/340 |
| 2009/0117245 A1 * | 5/2009 | Peyrat | 426/523 |
| 2009/0152276 A1 * | 6/2009 | Groll | 220/573.4 |
| 2010/0260910 A1 * | 10/2010 | Backus et al. | 426/523 |
| 2012/0107476 A1 * | 5/2012 | McLemore et al. | 426/523 |

* cited by examiner

Section A-A

Detail B

Section A-A

Detail B

Section A-A

Detail B

Section A-A

Detail B

Section C-C

COOKING DEVICE AND METHOD OF COOKING

This application claims priority to U.S. Patent Application Ser. No. 61/482,661, filed May 5, 2011, entitled Cooking Device and Method of Cooking.

BACKGROUND OF THE INVENTION

Dispersing seasoning by imparting flavor-infused steam into cavities of chickens or turkeys during the cooking process can enhance the flavor of the food. Beer cans have been inserted into fowl for this purpose, but require the bird to be cooked in a "vertical" position to keep the contents of the can from spilling. Other devices to impart flavor from within have similar limitations. Additionally, insertion, removal and general handling of such devices can be difficult and sometimes dangerous because of the hot liquid contents.

What is needed is a cooking device that will disperse flavoring from within a chicken or other bird while the bird is disposed in a roasting pan in a conventional, horizontal position.

Further needed is a cooking device that will be relatively easy to insert and remove from the bird.

SUMMARY OF THE INVENTION

A cooking device is disclosed that can be inserted into food, such as in a cavity of a chicken. The device includes a shell having a top portion and a bottom portion, wherein the top portion is securable to the bottom portion at a latitudinal cross section of the shell. The top portion has one or more holes to allow seasoning placed in the device to permeate the food during the cooking process.

The bottom portion has a base with a surface disposed in a plane substantially parallel to the latitudinal cross section of the shell to enable the cooking device to stand on the base in a substantially upright position. This facilitates filling the device with seasoning. The base is further configured to facilitate removal of the device from the food.

A safety component may be included for maintaining or biasing the cooking device in a substantially horizontal resting position.

The top and bottom portions are secured in a manner to keep contents of the cooking device from leaking from between the portions. A seasoning fill line can be included, below which the seasoning will remain in the device even when the orientation of the device is changed for insertion into food.

The cooking device may include one or more top portions interchangeably securable to the bottom portion. The bottom portion can have a plurality of fill lines to correspond with each of the top portions.

The cooking device preferably has a domed top to facilitate insertion into food. In an exemplary embodiment of the invention, the cooking device is ellipsoid in shape.

A safety component can be included for maintaining or biasing the cooking device in a substantially horizontal position. An example of such a biasing component is a base with a flat edge wherein the distance measured perpendicularly from the flat edge to a line extending coincident with the major axis of the shell is substantially equal to the greatest minor radius of the shell so that the cooking device will be in a substantially horizontal position when resting on the flat edge.

In an exemplary embodiment of the invention, the base of the cooking device is configured to facilitate the device being disposed vertically during a cooking process, in addition to the possible horizontal position.

The invention also includes a cooking method that comprises filling the cooking device with seasoning, inserting it into food, and heating the food causing steam to be released through the holes of the cooking device into the food.

DESCRIPTION OF THE DRAWINGS

Illustrative embodiments of the invention are best understood from the following detailed description when read with the accompanying drawings.

DETAILED DESCRIPTION OF THE INVENTION

The invention is a cooking device to flavor, tenderize or otherwise enhance food during the cooking process. It can be disposed within food such as by inserting it into a cavity in a chicken, turkey or other bird, or by otherwise surrounding it by various types of food. The cleverly designed device, not only effectively distributes seasoning into food, but also may reduce the risk of burns and damage, such as from hot liquid spills or handling of hot cooking implements. The term "seasoning" as used herein includes herbs, spices, juices, tenderizers and any other food enhancing item. "Seasoning" as used herein further includes liquid which can be used alone or with which other seasonings can be mixed, for example wine, milk, water, bouillon and butter. It is noted that certain substantially solid items can produce liquid during the cooking process.

Figure 1:
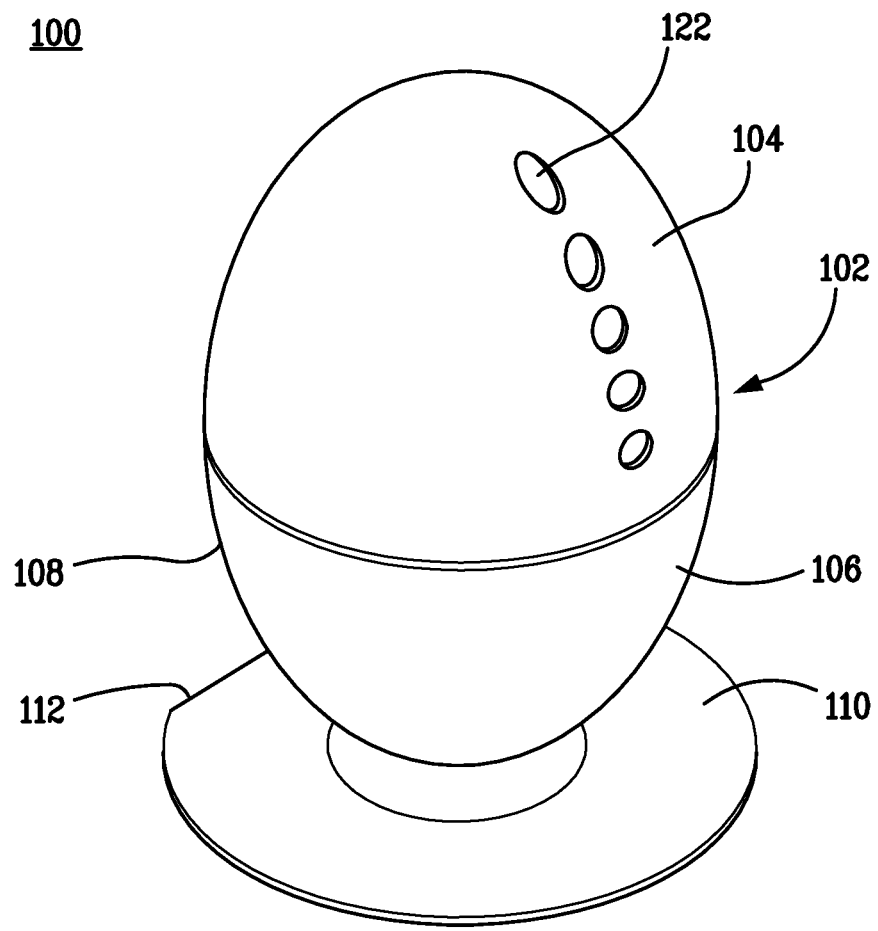
FIG. 1 depicts a cooking device according to an illustrative embodiment of the invention.

FIG. 1 depicts cooking device 100 according to an illustrative embodiment of the invention. Cooking device 100 has a shell 102 with a top portion 104 and a bottom portion 106. Top portion 104 is removably secured to bottom portion 106 at a latitudinal cross section 108 of the shell. Top and bottom portions 104, 106 can be separated so that cooking device 100 can be filled with seasoning. Once the top and bottom portions are reconnected, steam infused with flavors will rise through holes 122 in top portion 104 and permeate the food in which the device is placed. The ellipsoid or ovoid shape depicted in FIG. 1 provides a domed top to facilitate insertion into birds or other foods. The cooking device can also be spherical or have other shapes with a dome-shaped top.

The terms "top" and "bottom" as used herein are with respect to the cooking device being disposed substantially vertically, such as when it is positioned to be filled with seasoning. When in use though, the device is generally disposed substantially horizontally, although this may vary between embodiments as will be described below. As used herein "horizontal" and "vertical" are used in a general sense, and not as absolute positions. A vertical position of the cooking device generally specifies an upright position, such as shown in FIG. 1. A horizontal position of the cooking device is generally substantially perpendicular to the upright position but includes the device varying from the horizontal by a few degrees or so, for example as used during the cooking process. As will be understood, when inserted into a food cavity, the device will not necessarily be at a precise horizontal, but the term will be used for simplicity to refer to that position. As used herein, the cooking device is in a "resting" position when it is disposed generally horizontally.

Cooking device 100 also has a base 110, which preferably has a flat edge 112 so the device can be positioned on its side without rolling in a "resting" position. Base 110 may be integral with the bottom portion 106 or may be either fixedly or removably attached to it.

In addition to retaining the device in a stable position while being filled, the base can be configured to be graspable by a hand or with a coordinated implement to serve as a handle to remove the device from the food.

The base shown in FIG. 1 can be grasped directly or it can be configured to be used with an attachable component. For example, openings or flanges in the base or indented portions can accommodate a handle to be connected when the device is to be removed, thus avoiding handling a hot handle. If an attachable component is used, the feature to which it attaches should not interfere with standing the cooking device in a position for filling with seasonings. The base may be entirely planar and sufficient in size to balance the cooking device, or it may be merely a ring, a portion of a ring or other shape disposed in a manner to balance the device.

Figure 2A:
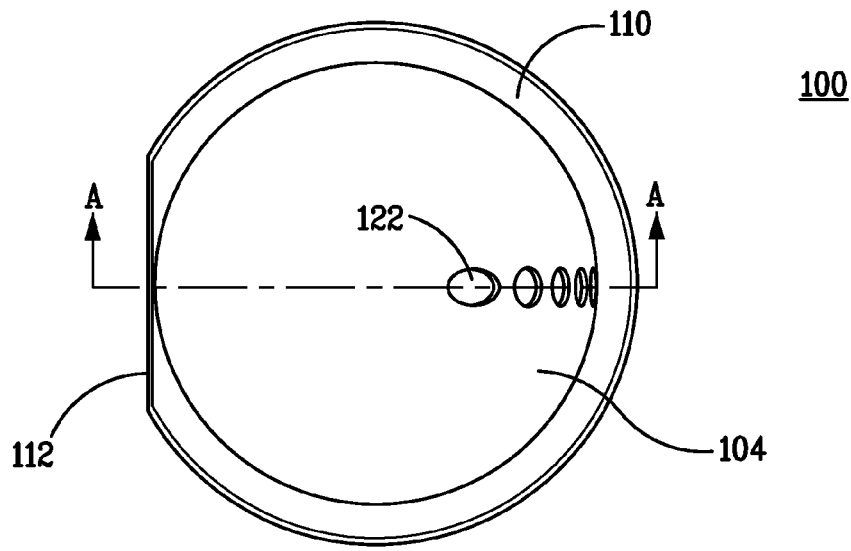
FIG. 2A is a top view of a cooking device according to an illustrative embodiment of the invention.
Figure 2B:
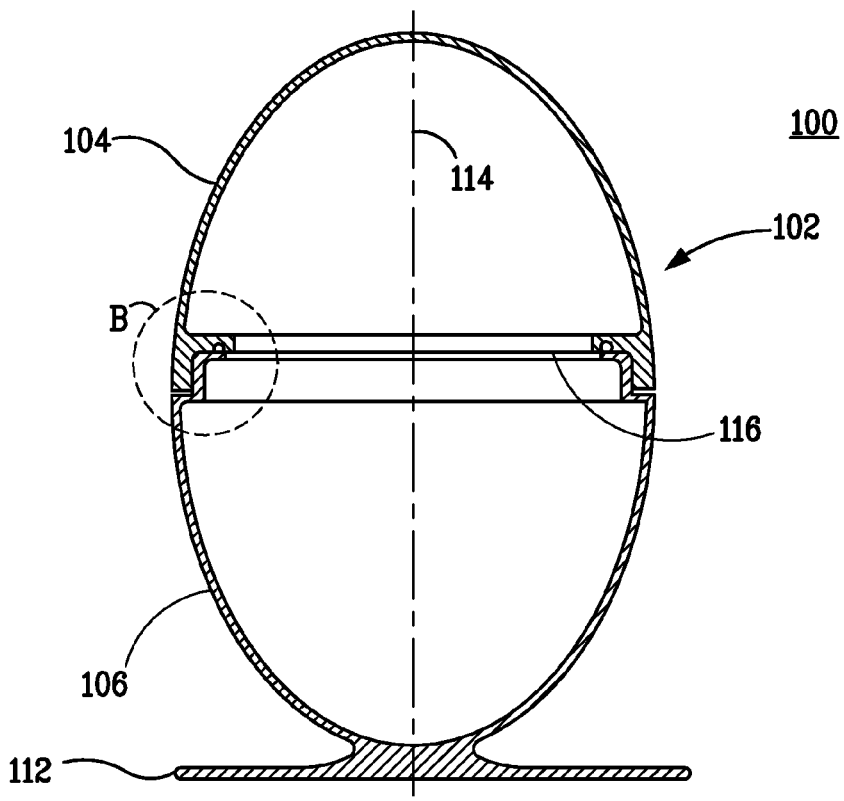
FIG. 2B is a cross-sectional view of a cooking device according to an illustrative embodiment of the invention.

FIG. 2A is a top view of cooking device 100 according to an illustrative embodiment of the invention. FIG. 2B is a cross-sectional view of cooking device 100. In this particular embodiment, shell 102 is substantially ellipsoid in shape and has a major axis 114 and a minor axis 116. Top portion 104 is securable to bottom portion 106 in a plane substantially perpendicular to the major axis 114. According to this embodiment of the invention, top portion 104 meets bottom portion 106 at a circular cross section of shell 102 at approximately its half-height.

Preferably flat edge 112 does not extend beyond minor axis 116 so major axis 114 remains substantially parallel to a surface on which cooking device 100 is disposed when the device is resting horizontally on flat edge 112. When flat edge 112 extends to the position noted in the previous sentence, the largest diameter of base 110 will be larger than minor axis 116.

Holes 122 are disposed opposite to flat edge 112, so when cooking device 100 is in a substantially horizontal resting position, liquids and other seasoning that may be in top portion 104 will not spill out of the device. Generally, the holes are situated so when the device is in the filling position, i.e. upright on its base, liquids and solids inserted into the device will be contained in the bottom portion. Once the bottom and top portions of the shell are connected, the device will allow for steam to migrate out of holes in the top portion to flavor the food.

Figure 2C:
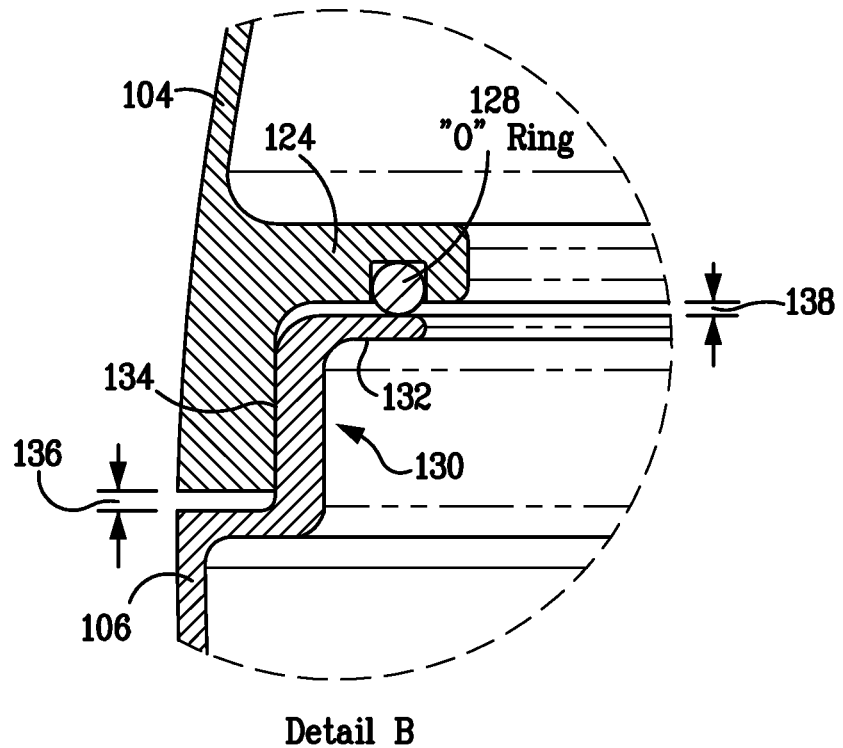
FIG. 2C depicts an enlargement of the interface between the top portion and bottom portion of a cooking device according to an illustrative embodiment of the invention.

FIG. 2C depicts an enlargement of the interface between top portion 104 and bottom portion 106 according to an illustrative embodiment of the invention. Top portion 104 has a circumferential flange 124 extending inward from an interior edge or surface. Top portion flange 124 has a groove in which a circumferential gasket 128, such as an O-ring, is disposed. Bottom portion 106 has a complimentary circumferential flange 130 extending inward from an interior edge or surface. An end portion 132 of bottom portion flange 130 is positioned so that it sandwiches gasket 128 between it and top portion flange 124. The configuration can be reversed so the gasket is positioned in bottom portion 106.

Figure 2D:
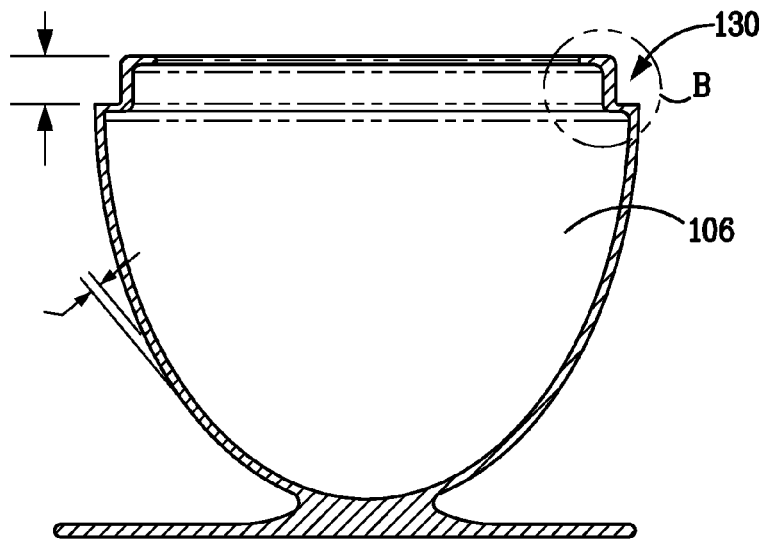
FIG. 2D is a cross sectional view of a bottom portion of a cooking device according to an illustrative embodiment of the invention.
Figure 2E:
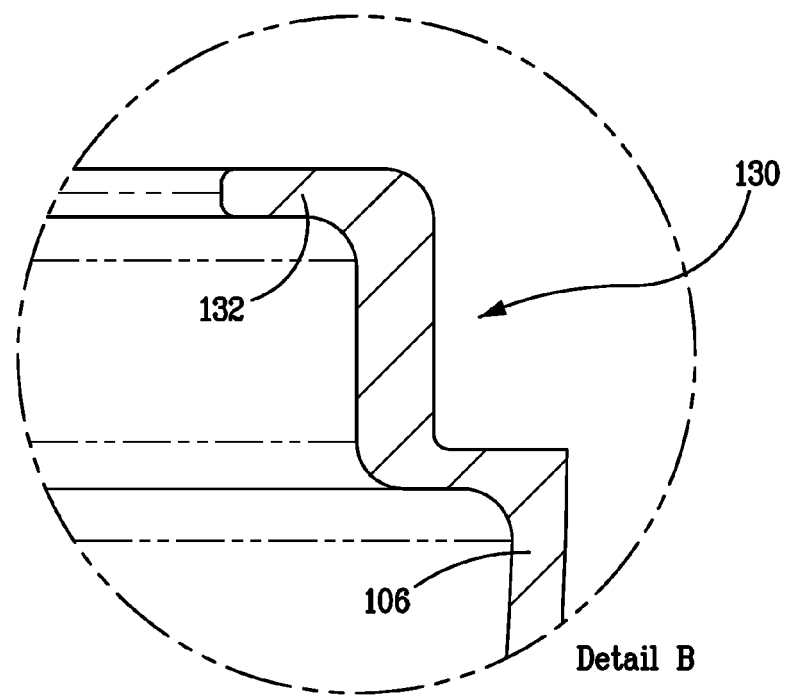
FIG. 2E is an enlargement of a bottom portion flange according to an illustrative embodiment of the invention.

FIG. 2D is a cross sectional view of bottom portion 106. FIG. 2E is an enlargement of bottom portion flange 130.

Bottom portion 106 can be detachably connected to top portion 104 via threaded engagement, such as at the vertical interface 134 of top portion 104 and bottom flange 130 shown in FIG. 2C. Gaps 136 and 138 preferably exist between top portion 104 and bottom portion 106 to accommodate compression of gasket 128. An illustrative gap size range is about 0.02 to about 0.04 inches for a cooking device having a longitudinal diameter in the range of about 4 inches to about 7 inches. Other attachment mechanisms, such as press-fit connections can be used, but a threaded interface can provide desirable control during separation of the top and bottom portions to minimize potential spills.

Figure 3:
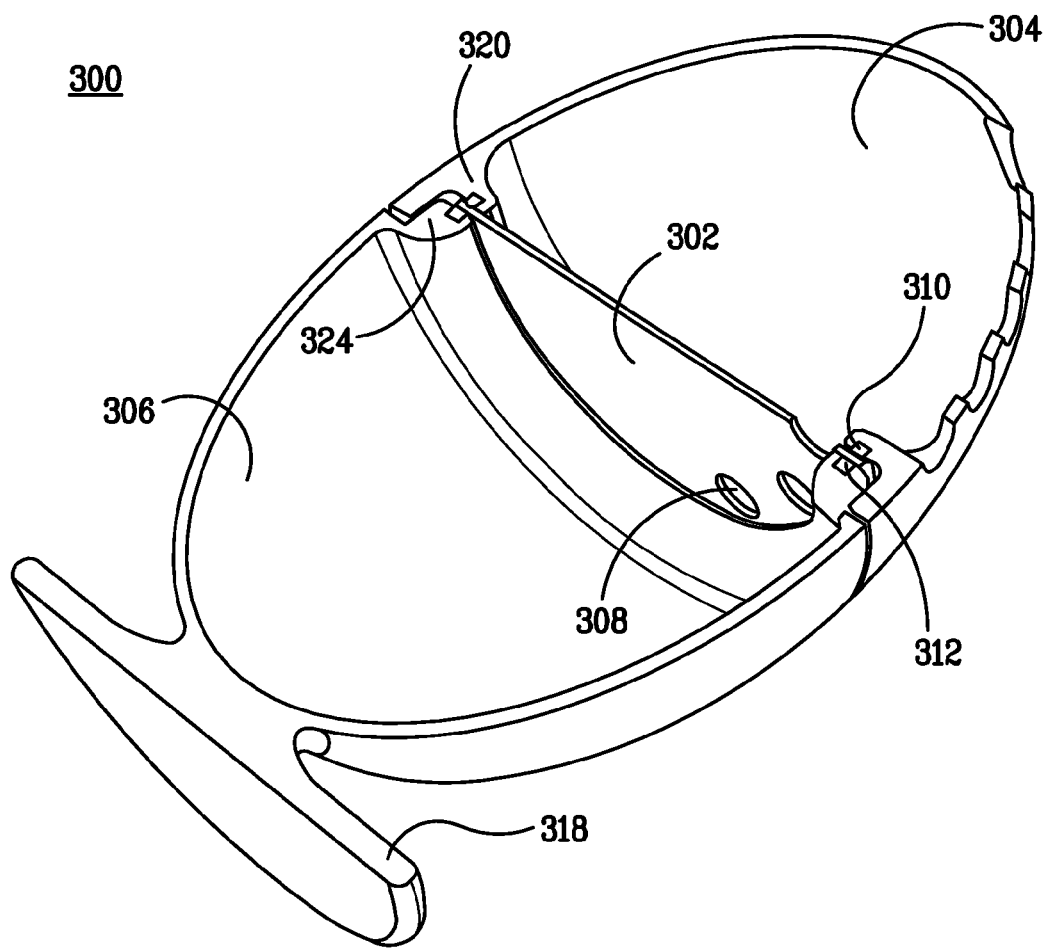
FIG. 3 depicts a cross section of a cooking device according to a further illustrative embodiment of the invention which includes a central disc.

FIG. 3 depicts a cross section of a cooking device 300 according to a further illustrative embodiment of the invention, in which a disc 302 separates a top portion 304 from a bottom portion 306. In this embodiment, disc 302 is disposed in a plane at a latitudinal diameter of the shell at the intersection of the top portion 304 and bottom portion 306. Disc 302 may rest in bottom portion 306 or it may be connected to top portion 304, such as by threaded engagement for example, or an interference fit so when the halves are separated, seasoning can be placed into the bottom half.

Figure 4A:
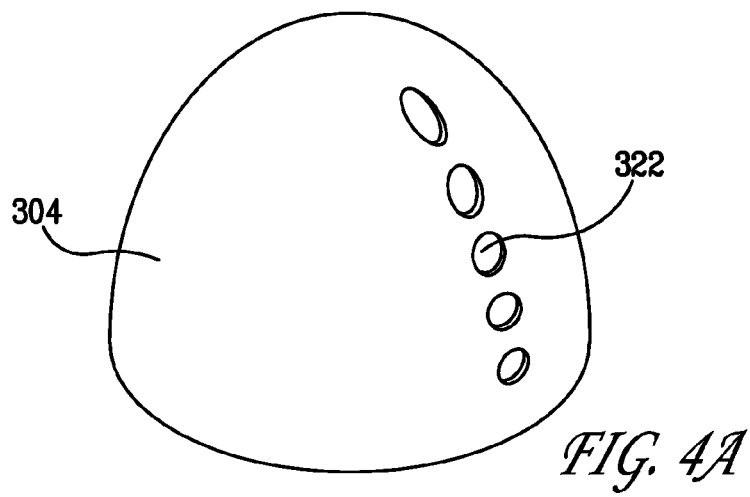
FIGS. 4A-E depict various views of a top portion of a cooking device according to an illustrative embodiment of the invention.
Figure 4B:
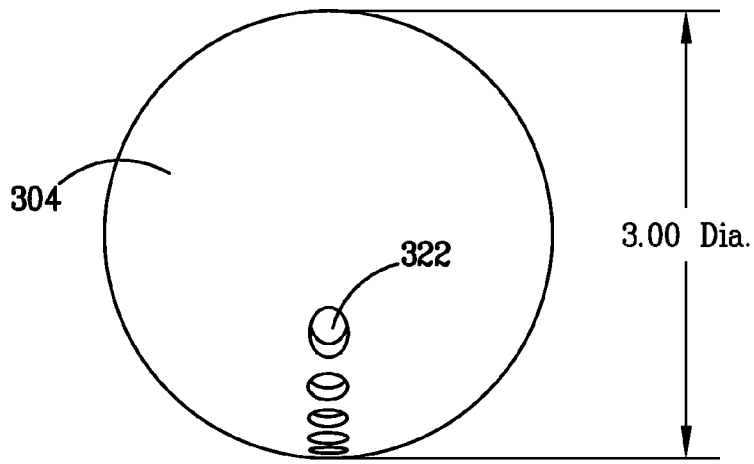
Figure 4C:
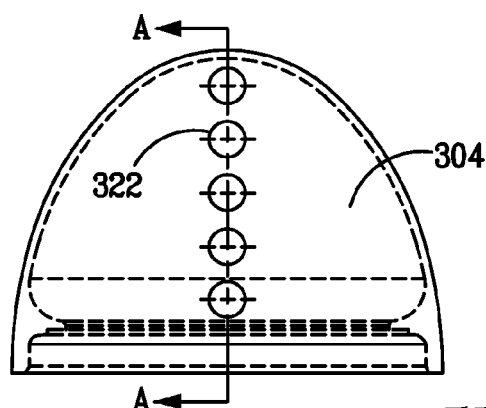
Figure 4D:
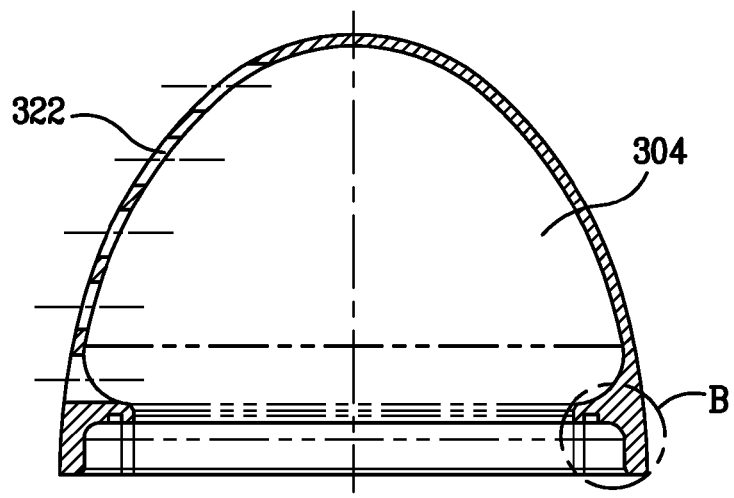
Figure 4E:
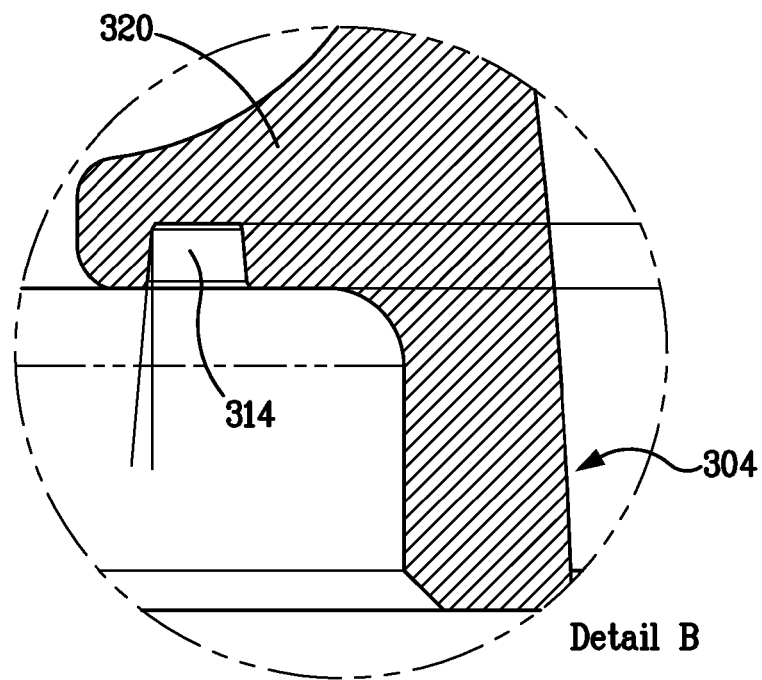

FIGS. 4A-E depict various views of top portion 304. FIG. 4A depicts a perspective view of the outside of top portion 304 containing a plurality of holes 322. FIG. 4B is a top view top portion 304. FIG. 4C is a schematic side view of top portion 304. FIG. 4D is a cross section through line AA, as shown in FIG. 4C. FIG. 4E is an enlargement of the bottom edge of top portion 304 showing circumferential groove 314 in which gasket 310 is disposed.

Figure 5A:
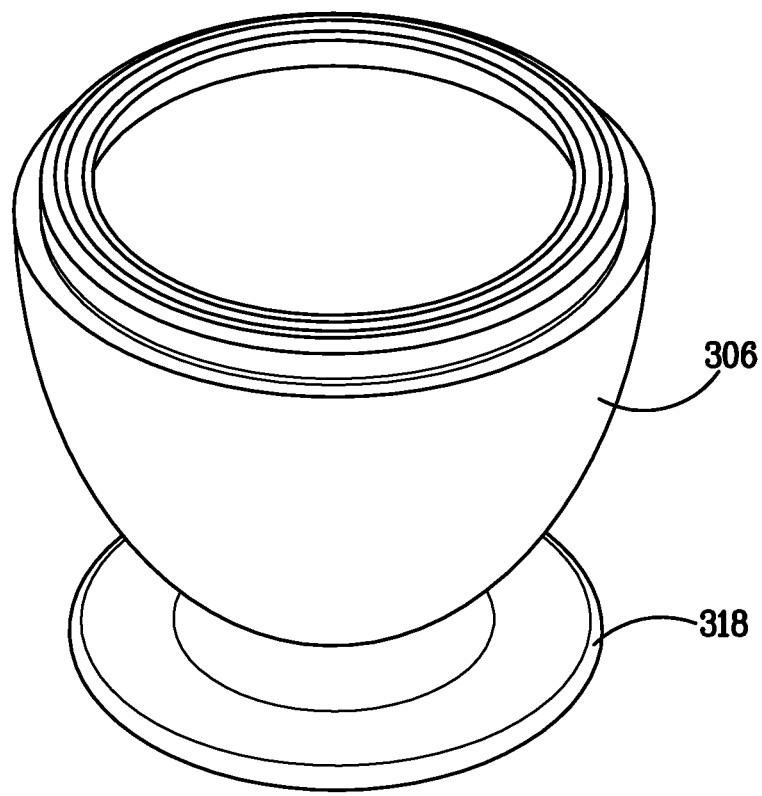
FIGS. 5A-E depict various views of a bottom portion of a cooking device according to an illustrative embodiment of the invention.
Figure 5B:
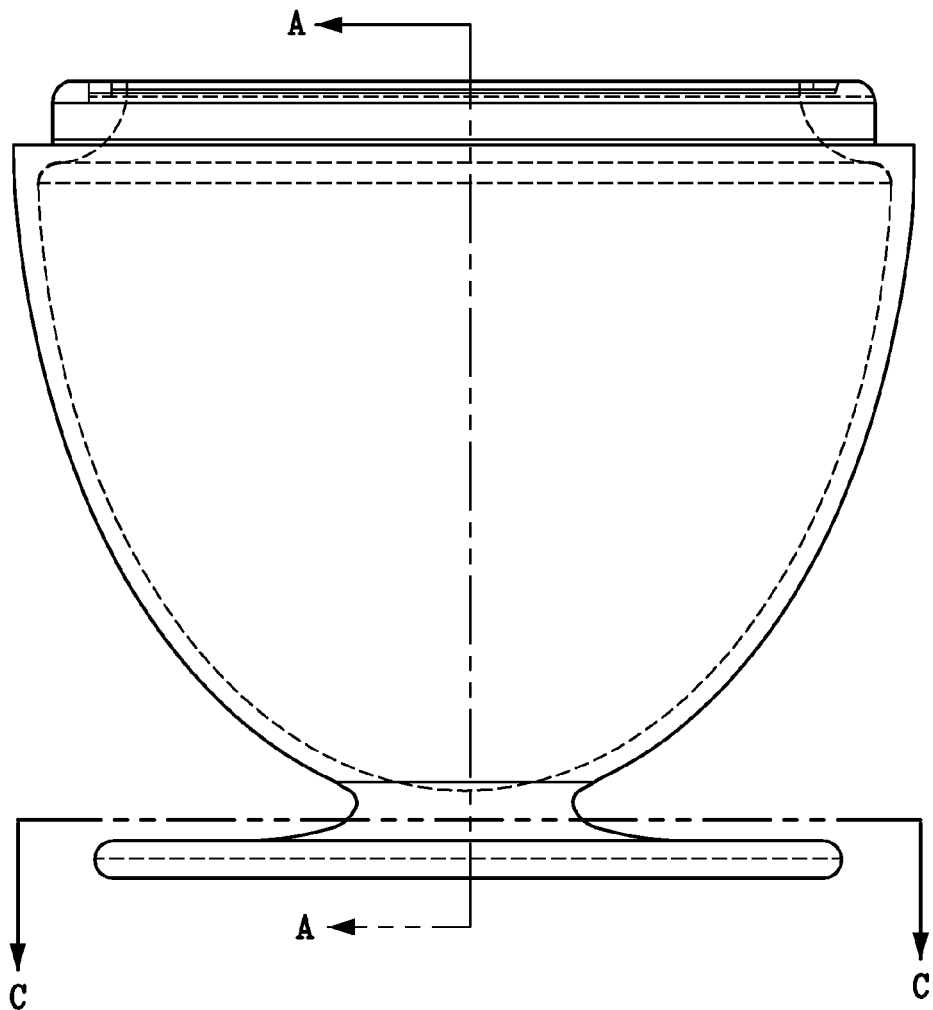
Figure 5C:
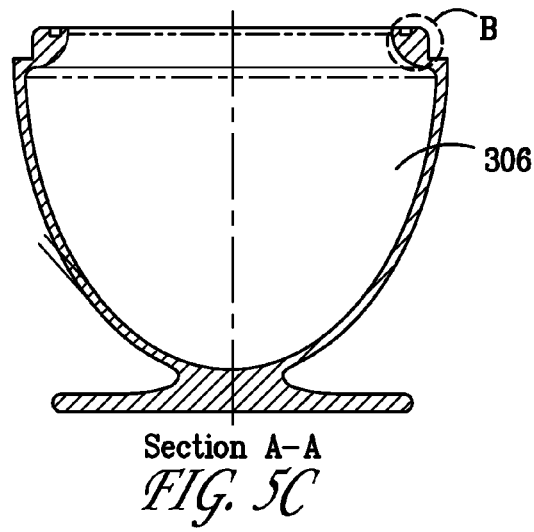
Figure 5D:
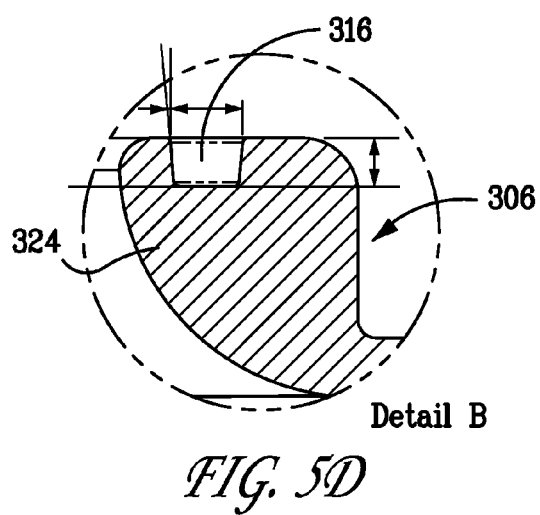
Figure 5E:
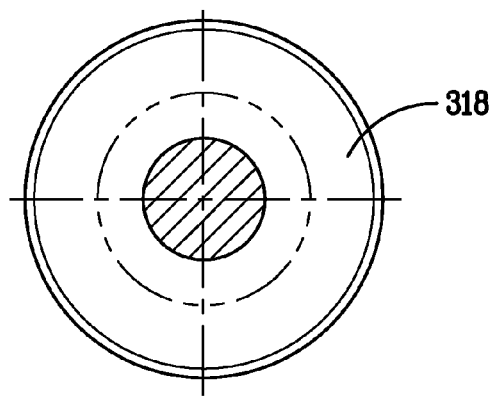

FIGS. 5A-E depict various views of bottom portion 306. FIG. 5A depicts a perspective view of bottom portion 306, including base 318. FIG. 5B is a schematic side view of bottom portion 306. FIG. 5C is a cross section through line AA, as shown in FIG. 5B. FIG. 5D is an enlargement of a cross section of an upper edge of bottom portion 306. FIG. 5E is a cross section through line CC, as shown in FIG. 5B.

As shown in FIGS. 3, 4E and 5D, cooking device 300 contains gaskets 310, 312 disposed within grooves 314, 316 respectively. Grooves 314, 316 are contained in top portion 304 and bottom portion 306, respectively. Groove 314 is disposed within a circumferential flange 320 extending inward from an inner surface of the top portion 304. Groove 316 is disposed on a circumferential flange 324 extending inward from an inner surface of the bottom portion. Disc 302 is disposed at a latitudinal cross-sectional plane of the shell at the intersection of top portion 304 and bottom portion 306 and securable between the top portion gasket 310 and bottom portion gasket 312. Disc 302 can thus, control the flow of the contents of cooking device 300 between top portion 304 and bottom portion 306. Generally, any exterior interface between parts of the cooking device containing seasonings should include a gasket to retain the seasoning within the device throughout the cooking process, and enable flavoring to be emitted primarily or only through the holes included for that purpose.

Figure 6:
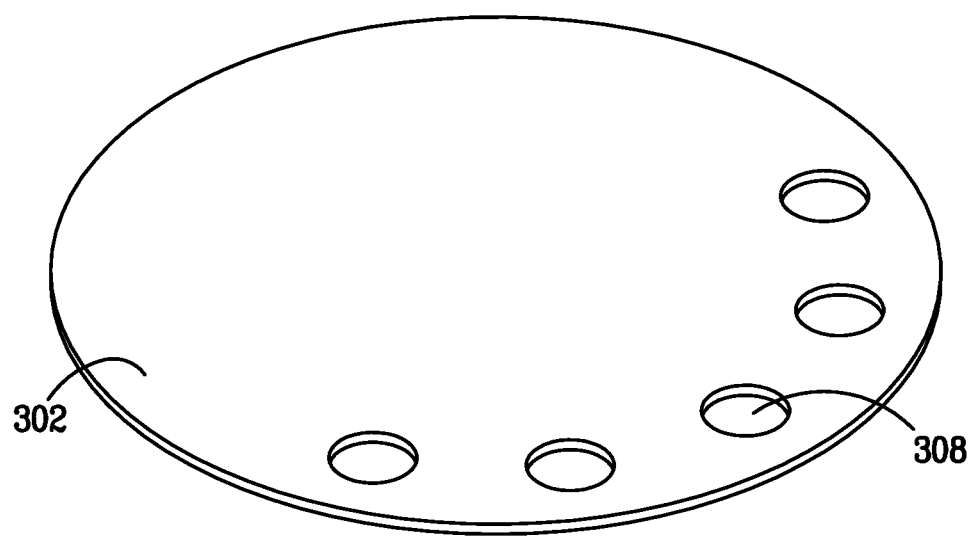
FIG. 6 depicts a disc according to an illustrative embodiment of the invention.

As shown in FIG. 6, disc 302 includes one or more holes 308 therein. If disc 302 is positioned such that holes 308 are on the upper section of the disc when positioned in device 300 while device 300 is disposed substantially horizontal, then only steam will flow from bottom portion 306 to top portion 304. Any solids or liquids will remain in bottom portion 306. Holes in the top portion of the cooking device can also be located in the upper section so when the device is placed on its side, such as when inserted into a bird for cooking in the traditional manner, steam can pass through the central disc and into the bird.

If any of holes 308 are disposed in the lower portion of disc 302 when positioned in device 300 while device 300 is disposed substantially horizontal, then contents of bottom portion 306 may flow or be transported to top portion 304. Cooking device 300 will generally be in a substantially horizontal position when inserted into food and in a substantially vertical position when in a filling position. The disc can be slightly concave toward the base to allow liquid to readily flow back into the bottom portion before the top and bottom portions are separated after use.

In illustrative embodiments of the invention, the device can be used in a horizontal or vertical position, thus providing the user with added options, as compared to known cooking devices. The base can be configured to facilitate cooking in the vertical position, for example by having a flat bottom surface and being sufficiently large enough to counter tipping when it is inserted into food. A separate, base can also be provided into which the base that is integral with, or a standard part of, the device can be set or secured. This separate base would provide the size necessary to counter tipping. The configuration of holes may differ for use in the vertical position. For example, holes may be distributed around the entire circumference of the top portion.

Figure 7:
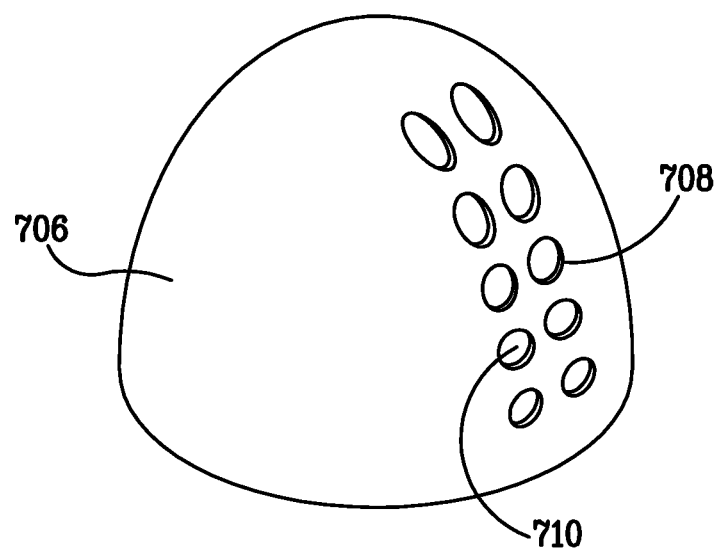
FIG. 7 depicts a top portion of a cooking device with two rows of holes according to an illustrative embodiment of the invention.

Whether a disc is used or not, the placement, number and size of the holes can dictate how the device can be used and how the seasoning is imparted to the food. The cooking device can be sold with a plurality of interchangeable top portions to provide for different uses, or a variety of top portions can be available for separate purchase. The top portions can vary for example as to the size, number and distribution of holes. For example, FIG. 7 depicts a top portion 706 with two rows of holes 708, 710.

Figure 8A:
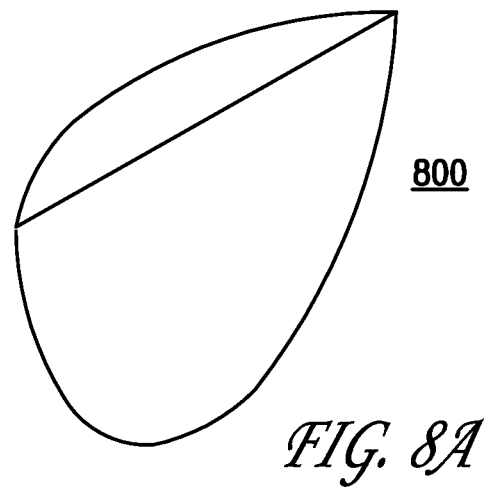
FIGS. 8A-E depict various views of a weight to bias the resting position of a cooking device according to an illustrative embodiment of the invention.
Figure 8B:
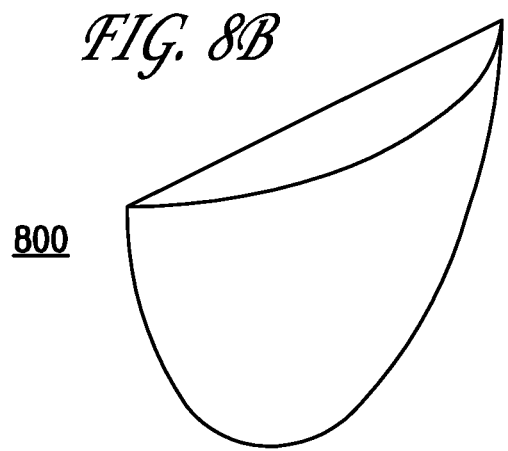
Figure 8C:
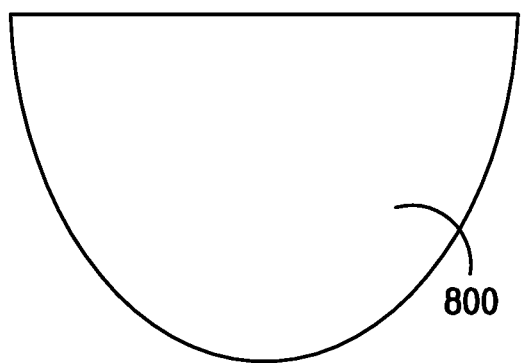
Figure 8D:
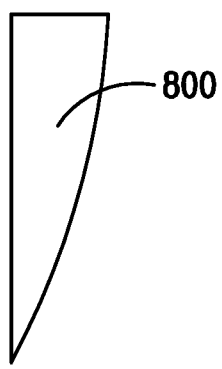
Figure 8E:
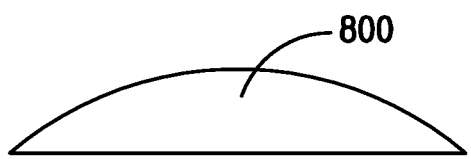

For safety purposes, it is desirable that the device achieve a particular position as quickly as possible if it is tipped over to reduce spilling of possibly hot liquid. It is also desirable for the cooking device to remain in a particular position at time. As described above, for example, the resting position can be maintained by use of a flat edge on the base. One or more weights can be employed to bias the cooking device to a particular position. In an exemplary embodiment of the invention, the body is weighted on the side not containing holes, for example by having a thicker wall on that side. Furthermore, the base will have a diameter that is substantially the same as the smaller central diameter of the oval so the device will be biased toward a horizontal position. A weight may be fixedly attached to or integral with the bottom portion along one side of it, so the cooking device will tend toward a position in which the weighted side is at the bottom when the device is disposed substantially horizontally. FIGS. 8A-E depict various views of a weight 800 according to an illustrative embodiment of the invention. FIGS. 8A-B are perspective views of weight 800 according to an illustrative embodiment of the invention. Weight 800 is preferably contoured to fit into a bottom portion, such as bottom portion 306 depicted in FIG. 3. Weight 800 can be fixedly attached to a bottom portion, top portion or both. FIGS. 8C-E show profiles of weight 800, in which it is can be seen how the outer profile of weight 800 would match the inside profile of a cooking device, such as cooking device 300 shown in FIG. 3. A cooking device with such a weight will tend toward a particular resting position but will generally not be as secure in that position as a device having a flat edge 112 on its base, such as shown in FIG. 1. Nonetheless, by having the cooking device achieve a particular position as quickly as possible if it is tipped over, may reduce spilling of possibly hot liquids.

Figure 9A:
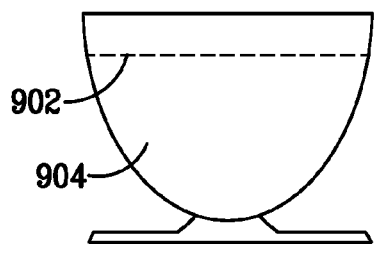
FIGS. 9A-B show examples of fill lines and the corresponding distribution of seasoning when the cooking device is in use in a substantially horizontal position, according to an illustrative embodiment of the invention.
Figure 9B:
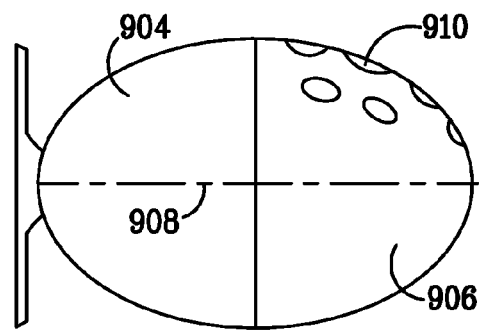

The cooking device can contain a fill line in the bottom portion to limit the liquid or other seasoning to an amount that allows it to be distributed in the device as desired when the device is inserted into food, and allow the associated flavoring to be distributed to the food, while keeping the seasoning from leaking out in an undesirable manner. The fill line can be the top edge of the bottom portion or can be a line designated below the top edge. FIGS. 9A, 9B, 10A, 10B, 11A and 11B show examples of fill lines and how the volume of seasoning contained beneath the fill line corresponds to the distribution of the seasoning when the cooking device is in use in a substantially horizontal position, according to illustrative embodiments of the invention. FIG. 9A shows fill line 902 in bottom portion 904. When top portion 906 is secured to bottom portion 904 and the cooking device is disposed substantially horizontally, such as when it is inserted into a chicken and placed in a roasting pan in a conventional manner, the seasoning reaches a level 908, as shown in FIG. 9B. Note that level 908 is below holes 910 that are in top portion 906. It is generally desirable to have level 908 extend to a point sufficiently below holes 910 to accommodate for departures of the cooking device from the true horizontal.

Figure 10A:
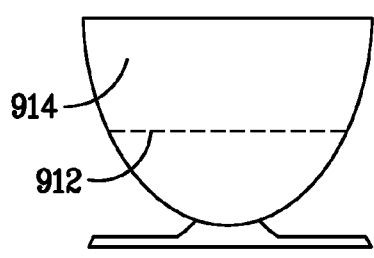
FIGS. 10A-B show examples of fill lines and the corresponding distribution of seasoning when the cooking device is in use in a substantially horizontal position, according to an illustrative embodiment of the invention.
Figure 10B:
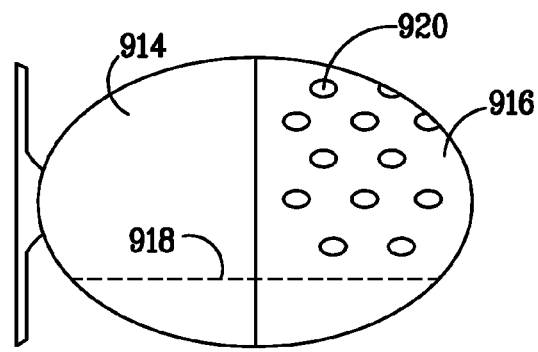

FIG. 10A shows a fill line 912 in a bottom portion 914. A smaller volume of seasoning is contained below fill line 912 that below fill line 902. Therefore, when the cooking device is disposed substantially horizontally as shown in FIG. 10B, level 918 will be lower than level 908 as shown in FIG. 9B. The lower level 918 accommodates the incorporation of additional holes 920 around top portion 916, without the contents leaking directly out.

Figure 11A:
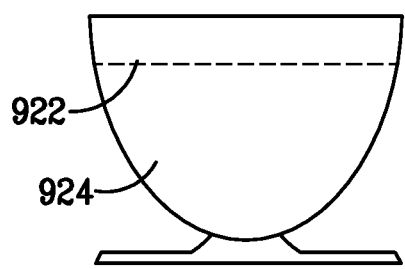
FIGS. 11A-B show examples of fill lines and the corresponding distribution of seasoning when the cooking device is in use in a substantially horizontal position, according to an illustrative embodiment of the invention.
Figure 11B:
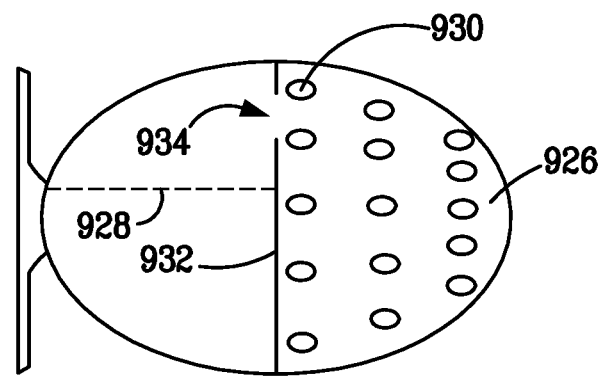

FIG. 11A depicts a fill line 922 in bottom portion 924. FIG. 11B depicts bottom portion 924 attached to top portion 926. A disc 932 is separates bottom portion 924 from top portion 926, but has at least one hole 934 to allow steam to migrate from bottom portion 924 to top portion 926 and out holes 930.

Seasonings reach a level 928, which is contained in only bottom portion 922, because hole 934 is above the seasoning level 928.

In an illustrative embodiment of the invention, the volume below the fill line when the cooking device is in a filling position, is in a range of about 60% to about 90% of the volume below the holes as measured when the cooking device is in a resting or substantially horizontal position. A further illustrative percent range is about 75% to about 85%.

Because the bottom portion can accommodate different tops, and can be sold in that manner, the bottom portion can include more than one fill line, each referenced to a particular top portion. For example, fill lines can each be labeled with a number, with the corresponding top having the same number applied to or embossed on it.

It is noted that for the fill lines to function as described above, the holes in the top portion must be positioned in a particular manner when secured to the bottom portion. To assure such alignment, a marking can be placed on each of the top and bottom portions that will be aligned when the portions are engaged. Alternatively, the top and bottom portions can be configured so when secured to one another, such as with threaded engagement, the desired alignment will automatically be attained.

The cooking device can be sized for different uses. For example, for use with a chicken, the device preferably has a longitudinal diameter of about 4.5 inches and a latitudinal diameter across the midsection of about 3 inches. For a turkey, the preferred dimensions are about 6 inches and about 4 inches, for the longitudinal and latitudinal diameters, respectively. A general illustrative range of dimensions is about 4 inches to about 6 inches in longitudinal diameter and about 3 inches to about 4 inches in latitudinal diameter. The aforementioned latitudinal diameters are also appropriate for the radius of a spherical cooking device. Smaller devices can be configured to be inserted into smaller birds or smaller openings in a bird.

The threaded engagement overlaps are preferably about 0.2 inches. The measurement from the bottom of the base to the top of the bottom portion is preferably about 2.7 inches. An illustrative range is about 2.5 inches to about 3.0 inches. Grooves in which gaskets are disposed are preferably about 0.75 inches wide at the bottom of the groove and about 0.80 inches at the top, with a depth of about 0.50.

Although the device has been described for use with fowl, it can be configured for use with other food, provided it can be inserted to impart seasoning from the inside, and the holes are properly distributed for the intended use.

The device has been described as having an ovoid or ellipsoid shape. This shape lends itself to smooth insertion into a bird because of the dome-shaped top. It also can conform somewhat to the shape of the cavity of a bird. Depending on the use of the cooking device, other shapes may be appropriate. For example, a spherical shape will also have a domed-shape top. A cone or cone-like top can also facilitate insertion into food. An ellipsoid shape with a base allows the food to conform around the shell, while leaving the base accessible for use as a "handle" to remove the device from the food.

The "holes" are not necessarily round and can have various sizes. The use of the device and manufacturing considerations will be two considerations when determining the size, shape and quantity of holes.

The device is preferably made of a food-grade stainless steel or other food-grade metal or alloy. Various metals and alloys, and coatings suitable for cooking are within the scope of the invention. To be suitable for cooking, the material must withstand the temperatures to which the cooking device will be exposed, and not impart any toxic or harmful material to the food or atmosphere. Metals and alloys can decrease the cooking time by heating the food from within through conduction. The degree by which cooking time is decreased can depend for example on, the thickness of the device walls, the overall size of the device and the devices contents. Decreased cooking time may result in moister food. An illustrative wall thickness range of the cooking device is from about 0.030 inches to about 0.040 inches.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications, for example, to the specific shape and dimensions of the cooking device may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A cooking device for insertion into food comprising:
a shell having a top portion and a bottom portion, wherein the top portion is securable to the bottom portion at a latitudinal cross section of the shell;
the top portion having one or more holes therein;
the bottom portion having a base with a surface disposed in a plane substantially parallel to the latitudinal cross section of the shell to enable the cooking device to be stood on the base in a substantially upright position; and
the base further configured for use to facilitate removal of the device from food;
a fill line in the bottom portion for filling the bottom portion with liquid when the bottom portion is in the substantially upright position;
wherein the volume below the fill line in the bottom portion is less than the volume of the shell below the one or more holes when the cooking device is in a substantially horizontal position.

2. The cooking device of claim 1 wherein the shell is substantially an ellipsoid.

3. The cooking device of claim 1 containing a safety component for maintaining or biasing the cooking device in a substantially horizontal position wherein the safety component comprises:
a flat edge on the base wherein a distance measured perpendicularly from the flat edge to a line extending coincident with the major axis of the shell is substantially equal to the greatest minor radius of the shell so that the cooking device will be in a substantially horizontal position when resting on the flat edge.

4. The cooking device of claim 1 containing a mechanism to contain the contents of the cooking device from leakage from between the top portion and the bottom portion wherein the mechanism to contain the contents comprises:
in either one of the top portion or bottom portion, a flange extending inward and having a groove to accommodate a gasket, such that when the top portion is secured to the bottom portion, a gasket placed in the groove will inhibit contents of the cooking device from leaking out of the shell.

5. The cooking device of claim 1 containing a mechanism to contain the contents of the cooking device from leakage from between the top portion and the bottom portion wherein the mechanism to contain the contents comprises:
   threaded engagement of the top portion with the bottom portion.

6. The cooking device of claim 1 further comprising one or more top portions interchangeably securable to the bottom portion.

7. The cooking device of claim 6 further comprising a plurality of till lines in the bottom portion wherein the volume below each fill line is less than the volume below the holes in a corresponding top portion when the cooking device is in a substantially horizontal position, and the fill lines and top portions are designated as corresponding.

8. The cooking device of claim wherein:
   the top portion has a groove to accommodate a top gasket;
   the bottom portion has a groove to accommodate a bottom gasket;
   a disc disposed at a latitudinal cross-sectional plane of the shell at the intersection of the top portion and bottom portion and securable between the top portion gasket and the bottom portion gasket; and
   the disc having one or more holes disposed therein.

9. The cooking device of claim 1 wherein the top portion is secured to the bottom portion at approximately the half-height of the shell.

10. The cooking device of claim 1 wherein the top portion has a domed top.

11. The cooking device of claim 1 wherein the base is integral with the bottom portion.

12. The cooking device of claim 8 wherein:
   the top portion has a circumferential flange extending inward from an inner surface of the top portion and the groove is disposed therein; and
   the bottom portion has a circumferential flange extending inward from an inner surface of the bottom portion and the groove is disposed therein.

13. The cooking device of claim 8 wherein the one or more disc holes are disposed only on one half side of the disc.

14. The cooking device of claim 1 containing a safety component for maintaining or biasing the cooking device in a substantially horizontal position wherein the safety component comprises:
   a weight to bias the device to a desired resting position.

15. The cooking device of claim 1 wherein the shell is shaped to facilitate insertion into food.

16. The cooking device of claim 1 wherein the thickness of the shell walls is in the range of about 0.03 inches to about 0.04 inches.

17. The cooking device of claim 1 wherein the base is configured to facilitate the device being disposed either horizontally or vertically during a cooking process.

18. A method of cooking comprising:
   providing a cooking device according to claim 1;
   filling the device with seasoning;
   inserting the cooking device into food; and
   heating the food causing, steam is released through the holes of the cooking device into the food.

19. The cooking device of claim 1 wherein the shell and base are formed from a food-grade metal or alloy.

20. A cooking device for insertion into food comprising:
   a shell having a top portion and a bottom portion, wherein the top portion is securable to the bottom portion at a latitudinal cross section of the shell;
   the top portion having one or more holes therein;
   the bottom portion having a base with a surface disposed in a plane substantially parallel to the latitudinal cross section of the shell to enable the cooking device to be stood on the base in a substantially upright position;
   the base further configured for use to facilitate removal of the device from food;
   a safety component for maintaining or biasing the cooking device in a substantially horizontal resting position; and
   a fill line in the bottom portion for filling the bottom portion with liquid when the bottom portion is in the substantially upright position;
   wherein the volume below the fill line in the bottom portion is less than the volume of the shell below the holes when the cooking device is in a substantially horizontal position; and
   wherein the shell and base are formed from a food-grade metal or alloy.

21. A cooking device for insertion into food comprising:
   a shell having a top portion and a bottom portion, wherein the top portion is securable to the bottom portion at a latitudinal cross section of the shell;
   the top portion having one or more holes therein;
   a disc disposed at a latitudinal cross-sectional plane of the shell at the intersection of the top portion and bottom portion and securable between the top portion gasket and the bottom portion gasket;
   the disc having one or more holes disposed therein;
   the bottom portion having a base with a surface disposed in a plane substantially parallel to the latitudinal cross section of the shell to enable the cooking device to be stood on the base in a substantially upright position;
   a fill line in the bottom portion for filling the bottom portion with liquid when the bottom portion is in the substantially upright position;
   wherein the volume below the till line in the bottom portion is less than the volume of the bottom portion of the shell below the one or more holes in the disc when the cooking device is in a substantially horizontal position.

* * * * *